(12) United States Patent
Beachy

(10) Patent No.: US 8,127,967 B1
(45) Date of Patent: *Mar. 6, 2012

(54) VOLUMETRIC CONTROL APPARATUS FOR FLUID DISPENSING

(75) Inventor: Timothy C. Beachy, Columbia City, IN (US)

(73) Assignee: University of South Florida, Tampa, FL (US)

( * ) Notice: Subject to any disclaimer, the term of this patent is extended or adjusted under 35 U.S.C. 154(b) by 1154 days.

This patent is subject to a terminal disclaimer.

(21) Appl. No.: 11/936,361

(22) Filed: Nov. 7, 2007

Related U.S. Application Data

(63) Continuation-in-part of application No. 11/163,534, filed on Oct. 21, 2005, now Pat. No. 7,306,115, which is a continuation of application No. PCT/US2004/012361, filed on Apr. 22, 2004.

(60) Provisional application No. 60/320,131, filed on Apr. 22, 2003.

(51) Int. Cl.
*G01F 11/00* (2006.01)

(52) U.S. Cl. .......................... 222/20; 222/14; 137/487.5

(58) Field of Classification Search .............. 222/14–17, 222/20; 137/486, 487.5, 599.05
See application file for complete search history.

(56) References Cited

U.S. PATENT DOCUMENTS

| | | |
|---|---|---|
| 3,672,479 A | 6/1972 | Schwertfeger et al. |
| 3,762,440 A | 10/1973 | Bryant |
| 4,280,530 A | 7/1981 | Yi |
| 4,532,962 A | 8/1985 | Campau |
| 4,936,508 A | 6/1990 | Ingalz |
| 5,431,302 A | 7/1995 | Tulley et al. |
| 5,433,342 A | 7/1995 | Luro |
| 6,196,065 B1 | 3/2001 | Henksmeier et al. |
| 6,206,241 B1 * | 3/2001 | Terrell et al. .................... 222/63 |
| 6,340,032 B1 | 1/2002 | Zosimadis |
| 6,598,245 B2 | 7/2003 | Nishioka |
| 7,306,115 B2 * | 12/2007 | Beachy ........................... 222/20 |
| 7,458,523 B2 * | 12/2008 | Hyslop ........................... 239/67 |

\* cited by examiner

*Primary Examiner* — Dinh Nguyen

(74) *Attorney, Agent, or Firm* — Molly L. Sauter; Smith & Hopen, P.A.

(57) ABSTRACT

The present invention provides an apparatus for dispensing fluid in preselected volumetric quantities. The apparatus comprises a valve positioned inline with a conduit holding fluid under pressure, a flow meter positioned inline with the conduit, a control unit communicatively coupled to the valve and flow meter, the control unit adapted to open and close the valve and detect data from the flow meter associated with the volume of fluid passing through the conduit, a units select switch having a plurality of preselected settings associated with a plurality of volumetric units, the units select switch communicatively coupled to the control unit, and an incrementing switch communicatively coupled to the control unit, whereby the control unit opens the valve responsive to activation of the incrementing switch thereby permitting fluid flow through the conduit until the control unit closes the valve responsive to the flow meter indicating a volume of fluid passed through the conduit substantially equal to a volumetric unit selected on the units select switch.

15 Claims, 4 Drawing Sheets

VOLUMETRIC CONTROL APPARATUS FOR FLUID DISPENSING

CROSS REFERENCE TO RELATED APPLICATIONS

This application is a continuation-in-part of U.S. patent application Ser. No. 11/163,534, filed on Oct. 21, 2005, which is a continuation of International Patent Application No. PCT/US2004/012361, filed on Apr. 22, 2004, which claims the benefit of U.S. Provisional Patent Application Ser. No. 60/320,131 filed Apr. 22, 2003.

BACKGROUND OF THE INVENTION

Conventional methods for measuring volumes of liquid require a collection of measuring implements, such as measuring cups and spoons. These measuring implements known in the art are fabricated to measure and deliver a preset volume of liquid as determined by each individual measuring implement. It is desirable to eliminate the need for measuring implements, and to instead provide a preset quantity of liquid directly from the source of the liquid. As an example, it is desirable to have the ability to supply a volume of water equal to a specific measurement directly from a kitchen faucet. Accordingly, it would be possible to supply a quantity equal to one cup, or 8 ounces, directly from the kitchen water faucet, eliminating the need for a one cup measuring device.

Systems are known in the art for supplying preset quantities of liquids and for metering fluid flow from a source. However, the systems known in the art do not describe an apparatus effective in supplying a preset quantity of liquid, as specified by a user, from a source of fluid under pressure. Additionally, while prior art systems are known for metering the flow of fluid from a source, these systems do not allow the user to select a specific volume to be dispensed. By contrast, the flow meter systems known in the art present the flow measurement to the user, but the systems do not control the initiation and termination of the fluid flow to dispense the specific volume selected by the user.

Accordingly, what is needed in the art is an apparatus for dispensing fluid in preselected quantities from a source of fluid under pressure, such as commonly exists in a domestic water supply.

SUMMARY OF INVENTION

The present invention provides an apparatus for dispensing fluids in preselected quantities. In accordance with an embodiment of the present invention, an apparatus is provided for dispensing fluid in preselected volumetric quantities. The apparatus comprises a valve, such as a solenoid valve, positioned inline with a conduit holding fluid under pressure, a flow meter positioned inline with the conduit, a control unit communicatively coupled to the valve and flow meter, the control unit adapted to open and close the valve and detect data from the flow meter associated with the volume of fluid passing through the conduit, a units select switch having a plurality of preselected settings associated with a plurality of volumetric units, the units select switch communicatively coupled to the control unit, and an incrementing switch communicatively coupled to the control unit, whereby the control unit opens the valve responsive to activation of the incrementing switch thereby permitting fluid flow through the conduit until control unit closes the valve responsive to flow meter indicating a volume of fluid passed through the conduit substantially equal to a volumetric unit selected on the units select switch.

In a particular embodiment, the conduit holding fluid under pressure further includes a faucet. It is within the scope of the present invention for the faucet to be integral with a kitchen or bathroom sink in addition to a faucet being integral to an outdoor source of water, such as a spigot. As such, the conduit may further include a manual faucet valve for initiating and terminating the flow of water as is commonly known in the art.

The fluid exists within the conduit of the apparatus under pressure. The operating pressure of the system maintains accuracy over a wide pressure range, thereby providing accuracy stability under pressure variations, inclusive of any typical water delivery pressures. In accordance a particular embodiment of the present invention, the pressure of the fluid under pressure is between about 25 psi and about 60 psi. This range of pressure is typical of a domestic water source. In an additional embodiment, the present invention further includes a pressure regulator positioned inline with the conduit. If the fluid pressure is not within the preferred range, the pressure regulator serves to regulate the fluid under pressure reaching the flow meter to between about 25 psi and about 60 psi.

In a particular embodiment, the flow meter further of the apparatus includes an infrared light emitting diode, an infrared phototransistor communicatively coupled to receive the light from the light emitting diode and to output a current to the control module and an impeller positioned inline with the conduit. The pressurized flow of fluid in the conduit causes the impeller to rotate. The rotation of the impeller intermittently obstructing the light transmitted from the light emitting diode to the infrared phototransistor thereby varying the output current of the phototransistor to the control module. The output current of the phototransistor is interpreted by the control module to measure the volume of dispensed fluid.

In an additional embodiment, the control unit of the present invention includes, a unit count circuit communicatively coupled to receive the output from the units select switch, an incremental unit count circuit communicatively coupled to receive the output from the incrementing switch, a non-zero detection circuit communicatively coupled to the valve and a count detection circuit communicatively coupled to receive the output from the flow meter, the unit count circuit and the incremental unit count circuit, the count detection circuit to compare the output of the flow meter to the output of the unit count circuit and the incremental unit count circuit and to provide output to the non-zero detection circuit for control of the valve.

In another embodiment, the control unit further includes a debouncing circuit positioned between the incrementing switch output and the incremental unit count circuit to suppress a switch contact bounce.

In another embodiment, the incrementing switch is a momentary push switch and the actuation of the push switch permits the fluid flow equal to the volumetric unit selected by the unit select switch. Additionally, the incrementing switch can be actuated a plurality of times such that each actuation communicates to the control unit to supply a volume of fluid equal to the volumetric unit selected by the unit select switch. In an exemplary embodiment, the unit select switch may be positioned to indicate a one-cup volume and thereby actuating the incrementing switch two times would be effective in dispensing two cups of fluid from the conduit.

In a particular embodiment, the units select switch is a rotary switch and the selection of the volumetric unit to be dispensed is determined by the position of the switch along the rotary sweep.

In an additional embodiment, the incrementing switch further includes an audible signal generator which emits an audible signal at every incrementing of the units counter. This embodiment provides audible feedback to a user as the user increases 'units to be dispensed' count.

In accordance with an additional embodiment, the volumetric control apparatus further includes a user definable volumetric unit that can be determined by the user and selected by the units select switch. As such, the user has the ability to define a volumetric unit specific to their needs. This custom setting will allow the user to define a unit of measure in addition to the preselected settings associated with the plurality of volumetric units. As an example, the user can define a single unit of measure to provide for the dispensing of 28 fluid ounces of water such that the dispensing of 28 fluid ounces would require only one activation of the incrementing switch. With this custom setting selected, 56 fluid ounces would be dispensed by the activation of the incrementing switch twice.

It is within the scope of the present invention to utilize the volumetric control apparatus of the present invention with a domestic water delivery system. The domestic water delivery system is known to supply appropriate pressure for operation of the system. The volumetric control apparatus is adaptable for use with a variety of faucet configurations.

Accordingly, the present invention provides a volumetric control apparatus for fluid dispensing that provides benefits over other systems known in the art. The present invention eliminates the need for peripheral measuring devices by allowing the user to select and dispense a controlled volume of fluid. The present invention allows the user to select a specific volume and the apparatus controls the fluid initiation and termination to dispense the user selected volume as specified.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Figure 1:
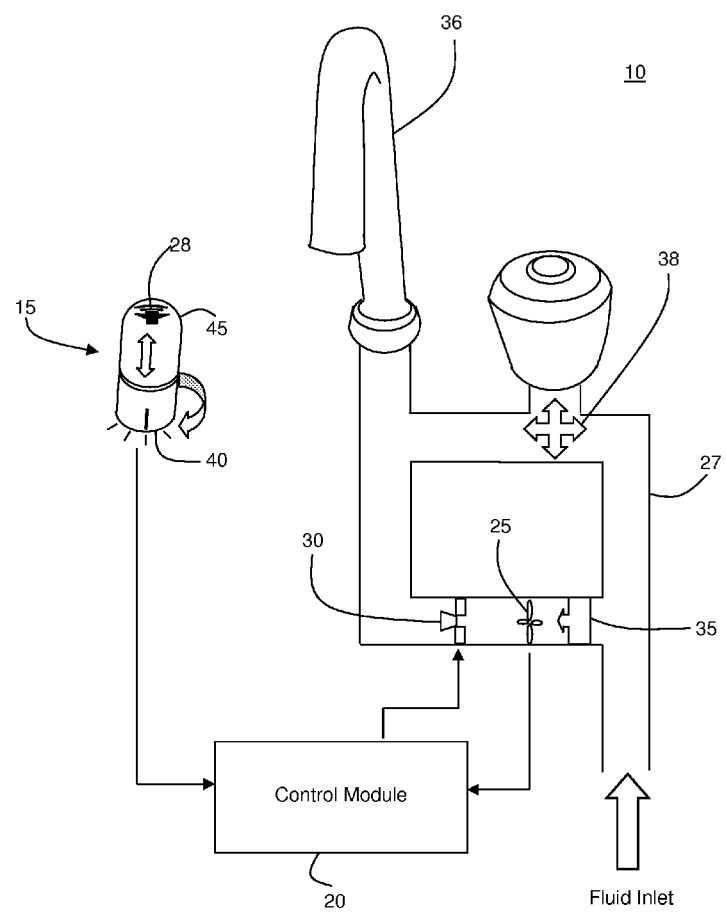
FIG. 1 is a diagrammatic view of an embodiment of the invention.

With reference to FIG. 1, in an overall view, the volumetric control apparatus for fluid dispensing 10 in accordance with the present invention includes a user control switch assembly 15, a control module 20, a water flow meter 25, and a solenoid water valve 30, wherein the water flow meter 25 and the solenoid water valve 30 are positioned within a conduit 27 for holding the water under pressure. Operation of the volumetric control apparatus of the present invention utilizes a 120 volt 50/60 Hz AC or DC battery supply and a water source under pressure. Water flow pressure resulting from a typical domestic water supply system is within the operating range required of the present invention. The operating range is about of 25 to 60 psi without a pressure regulator. However, an embodiment of the invention may include a pressure regulator 35 for pressures greater than 60 psi. As shown, the present invention can be utilized with a domestic water supply having a conventional faucet 36 and manual faucet valve control 38. Additionally, it is within the scope of the present invention to incorporate the volumetric control apparatus for use with an outdoor water supply, such as a conventional spigot and hose configuration. It is within the scope of the present invention to include an upstream in-line filter-screen with the outdoor water source embodiment to prevent objects from entering and obstructing the flow meter body.

In accordance with a preferred embodiment, the control switch assembly 15 includes a rotary switch 40 and a momentary push switch 45. The position of the rotary switch 40 along the sweep of rotation selects the units of measure for dispensing. The control switch assembly 15 may further include an audible signal generator 28 which emits an audible signal at every incrementing of the momentary push switch 45. The audible signal may be generated to confirm quantity selection. Units of measure can be represented by a variety of identifiers, including, but not limited to, English units and metric units. Accordingly, the units of measure could be cups, liters, pint, or a variety of other volumetric measurements known in the art. It is also within the scope of the invention to provide a customizable unit of measure that can be defined by the user as necessary. The apparatus may optionally have a user-definable control to adjust the volumetric units into different quantities or metric-English unit conversions. The number of times that the momentary push switch 45 is actuated determines the number of the selected units to be dispensed.

In an exemplary embodiment, as the momentary switch 45 is actuated, a 4-bit counter in the control module 20 is incremented, once for each actuation. A pause of one second or a cessation of actuating the momentary switch 45 allows the expiration of a timer in the control module 20. When active, this timer inhibits any control module operation other than the incrementing of the 4-bit counter. When the timer is expired and the 4-bit counter does not equal zero, the control module energizes the solenoid valve 30, establishing water flow.

Figure 2:
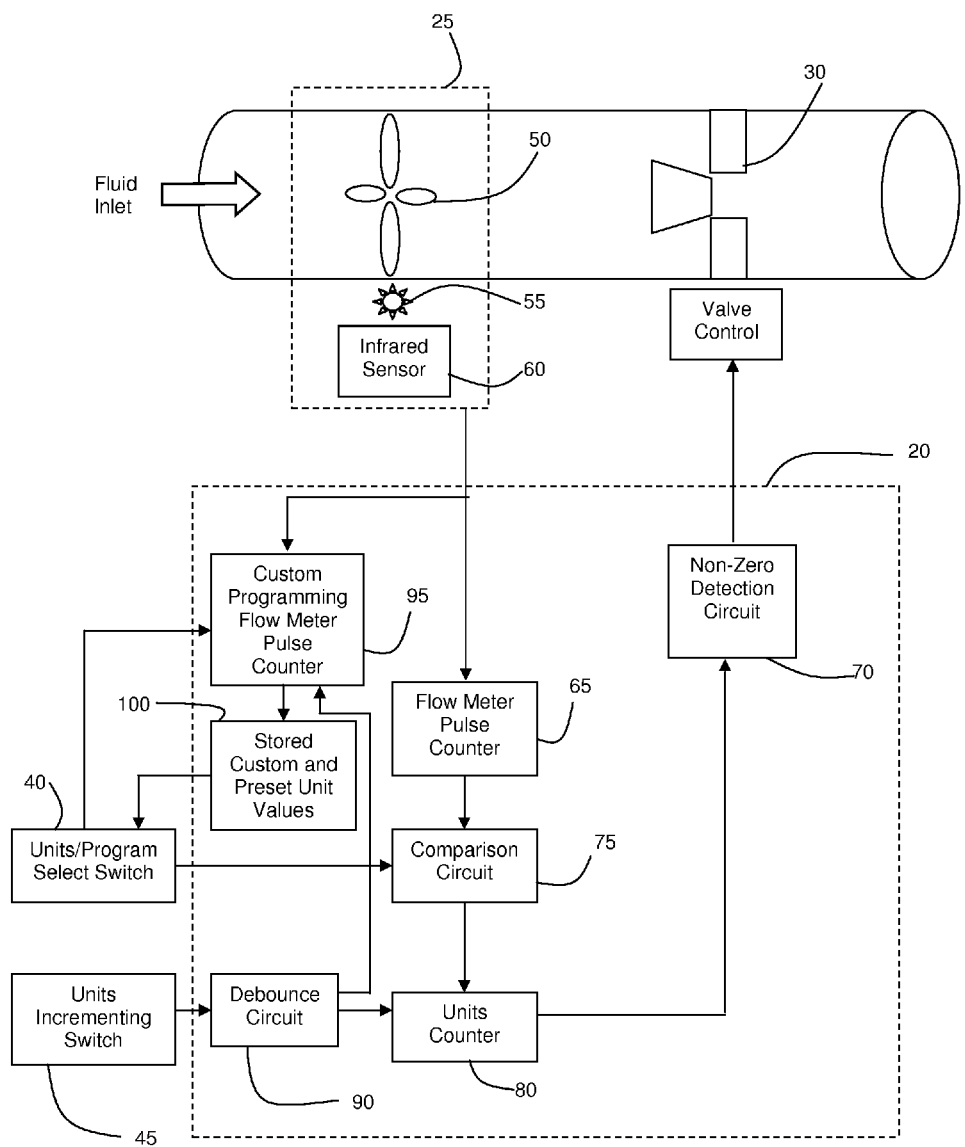
FIG. 2 is an elevated, isometric view of the control switch assembly according to an embodiment of the invention.

With reference to FIG. 2, flowing water from the water inlet spins the impeller 50 of the flow meter 25. The flow meter consists of a body with an impeller 50 situated such that the vanes on the impeller partially obstruct a light path established by an infrared LED 55 and an infrared phototransistor 60. The mass of the water is adequate to rotate the impeller as described by the present invention. Rotary motion of the impeller 50 disturbs the light path of the LED 55, varying the conduction of the phototransistor. The varying current is received by the control module 20 and translated into a voltage signal. The signal from the infrared photo sensor is fed to an op-amp amplifier to produce pulses that represent the rotary motion of the impeller. These pulses are fed to a flow meter pulse counter 65, incrementing the count each time a pulse is received. The pulse count is sensed by a comparison circuit 75 that has count detection gates. Custom and preset unit values are stored 100 and selected by a units/program select switch 40 and fed to the comparison circuit 75 which outputs a pulse when the selected unit value from the units/program select switch 40 matches the flow meter pulse count 65. The output of the comparison circuit 75 decrements the units counter 80 and resets the flow meter pulse count 65 to zero. The units counter 80 stores the number of times that the units incrementing switch 45 is actuated, thereby selecting the number of the selected units to be dispensed. Eventually the units counter 80 will count down to zero. Logic gates 70 detect the zero count. The detected zero-signal causes the controller to de-energize the solenoid valve 30, halting the flow of water. The solenoid valve 30 of the present invention is adaptable to be used with a domestic water delivery system.

The present invention is not limited to the propeller driven infrared flow meter as previously described. Various other flow meters are well known in the art and are within the scope of the present invention to be integrated with the incrementing switch as disclosed. Other flow meters known in the art include insertion, differential pressure, ultrasonic, vortex and magnetic.

When a mechanical switch is operated, power is not available instantly. When a switch is closed the contacts bounce together many times before finally touching firmly. This phenomenon is called contact bounce. It is a small scale and very fast version of what happens when a ball is dropped on the floor. The bounce of the switch contacts 45 generates a series of pulses that may cause the counter circuitry 20 to incorrectly interpret the series of pulses generated. In accordance with the present invention, a debounce circuit 90 is provided. The debounce circuit 90 is preferably deposed between the units-incrementing momentary switch 85 and the incremental units count circuit 80. The debounce circuit removes switch bounce. Removing the bounce in the switch contacts is necessary in certain applications, particularly where counting is required and the input is a mechanical switch. The capacitive elements utilized in the debounce circuit effectively suppress the bouncing action electronically.

Figure 3:
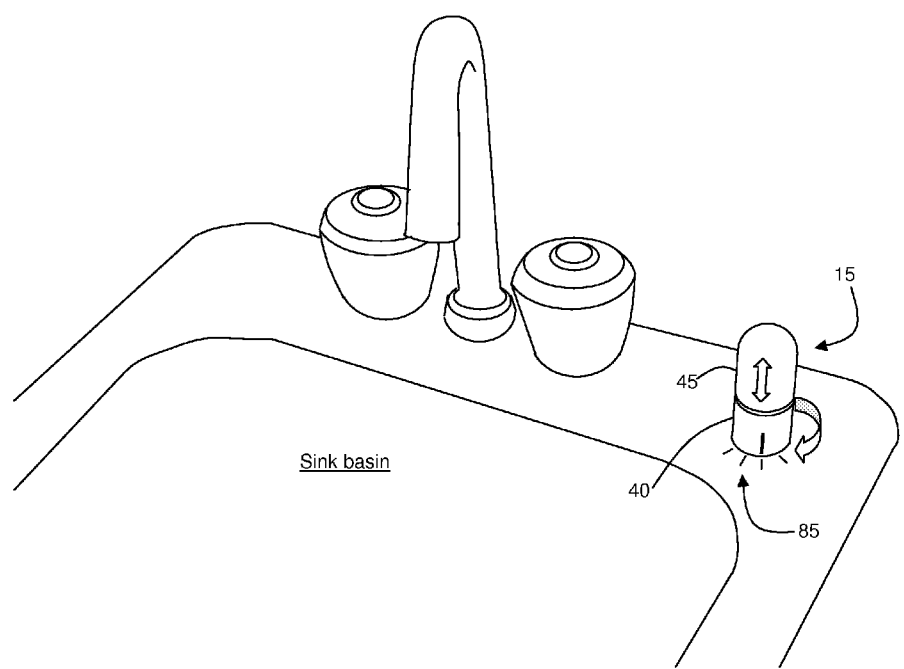
FIG. 3 is an elevated, isometric view of the control switch assembly according to an embodiment of the invention.
Figure 4:
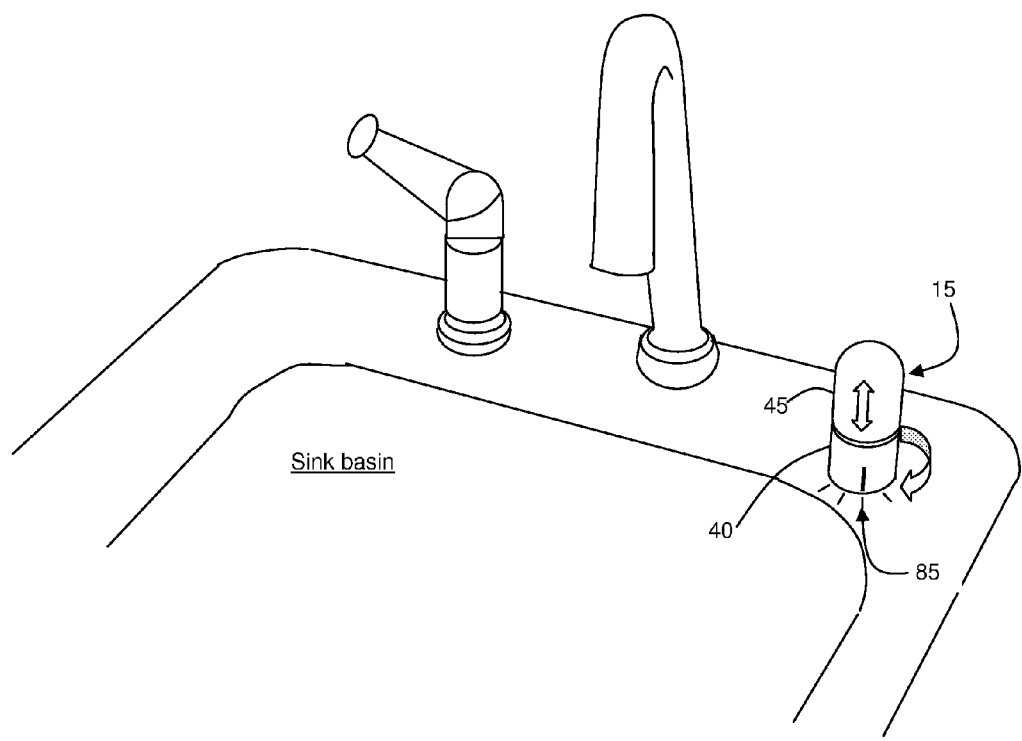
FIG. 4 is an isometric view of the present invention.

With reference to FIG. 3 and FIG. 4, the user control switch assembly 15 is shown relative to an installation with a conventional kitchen faucet. FIG. 3 illustrates a conventional faucet configuration have independent hot and cold water valves. FIG. 4 illustrates a conventional faucet configuration incorporating a lever handle for controlling the hot and cold water mix. The units select rotary switch 40 is shown, in addition to the volumetric indicators 85 along the length of the rotary sweep. The incrementing momentary push switch 45 is also illustrated.

It is within the scope of the invention to provide both cold, hot or mixed-temperature water. The device may also be adapted for use with a water softener or water filter device as required.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. An apparatus for dispensing fluid water in preselected volumetric quantities from a domestic water delivery system, the apparatus comprising:

a valve positioned inline with a conduit for holding water under pressure from a domestic water delivery system;

a flow meter positioned inline with the conduit;

a control unit communicatively coupled to the valve and the flow meter, the control unit adapted to open and close the valve and detect data from the flow meter associated with the volume of water passing through the conduit;

a units select switch having a plurality of preselected settings associated with a plurality of volumetric units, the units select switch communicatively coupled to the control unit; and an incrementing switch communicatively coupled to the control unit, whereby the control unit opens the valve responsive to actuation of the incrementing switch, the incrementing switch being actuatable a plurality of times, wherein the number of actuations of the incrementing switch determines the number of volumetric units selected by the units select switch to be dispensed, the actuation of the incrementing switch thereby permitting the flow of water through the conduit until the control unit closes the valve responsive to the data from the flow meter indicating that the volume of water that has passed through the conduit is substantially equal to the volumetric unit selected on the units select switch in combination with the number of actuations of the incrementing switch.

2. The apparatus of claim 1, wherein the incrementing switch further comprising an audible signal generator, the audible signal generator for generating an audible signal in response to the actuation of the incrementing switch.

3. The apparatus of claim 1, wherein the flow meter is selected from the group consisting of a propeller flow meter, an insertion flow meter, a differential pressure flow meter, an ultrasonic flow meter, a vortex flow meter and a magnetic flow meter.

4. The apparatus of claim 1, wherein the conduit for holding the water under pressure further comprises a faucet.

5. The apparatus of claim 2, further comprising a manual faucet valve, wherein the flow of water from the faucet is controlled by the manual faucet valve.

6. The apparatus of claim 1, wherein the valve is a solenoid valve.

7. The apparatus of claim 1, wherein the pressure of the water in the conduit is between about 25 psi and about 60 psi.

8. The apparatus of claim 1, further comprising a pressure regulator positioned inline with the conduit, the pressure regulator to regulate the water reaching the flow meter to between about 25 psi and about 60 psi.

9. The apparatus of claim 1, wherein the flow meter further comprises:

an infrared light emitting diode;

an infrared phototransistor communicatively coupled to receive the light from the light emitting diode and to output a current to the control module;

an impeller positioned inline with the conduit, the rotation of the impeller intermittently obstructing the light transmitted from the light emitting diode to the infrared phototransistor thereby varying the output current of the phototransistor to the control module.

10. The apparatus of claim 1, wherein the control unit further comprises:

a units counter circuit communicatively coupled to receive the output from the incrementing switch;

a non-zero detection circuit communicatively coupled between the valve and the units counter circuit;

a flow meter pulse counter communicatively coupled to receive the output from the flow meter;

a comparison circuit communicatively coupled to receive the output from the units select switch, and the output from the flow meter pulse counter, the comparison circuit to compare the output of the flow meter to the output of the units select switch and to decrement the units counter to provide output to the non-zero detection circuit for control of the valve.

11. The apparatus of claim 8, further comprising a debouncing circuit positioned between the output of the units incrementing switch and the units counter circuit to suppress a switch contact bounce.

12. The apparatus of claim 1, wherein the units select switch further comprises at least one user definable volumetric unit.

13. The apparatus of claim 1, whereby the units select switch is a rotary switch and the plurality of volumetric units are selected by the rotation of the switch.

14. The apparatus of claim 1, whereby the incrementing switch is a momentary push switch, the actuation of the push switch to permit the flow of water equal to the volumetric unit selected by the unit select switch.

15. An apparatus for dispensing water in preselected volumetric quantities from a domestic water delivery system, the apparatus comprising:

a valve positioned inline with a conduit holding water from a domestic water delivery system under pressure;

a flow meter positioned inline with the conduit;

a control unit communicatively coupled to the valve and flow meter, the control unit adapted to open and close the valve and detect data from the flow meter associated with the volume of water passing through the conduit;

a rotary units select switch having a plurality of preselected settings associated with a plurality of volumetric units, the units select switch communicatively coupled to the control unit; and an incrementing switch communicatively coupled to the control unit, whereby the control unit opens the valve responsive to actuation of the incrementing switch, the incrementing switch being actuatable a plurality of times, wherein the number of actuations of the incrementing switch determines the number of volumetric units selected by the units select switch to be dispensed, the actuation of the incrementing switch thereby permitting the flow of water through the conduit until the control unit closes the valve responsive to the data from the flow meter indicating that the volume of water that has passed through the conduit is substantially equal to the volumetric unit selected on the units select switch in combination with the number of actuations of the incrementing switch.

\* \* \* \* \*